Nov. 16, 1954     S. F. JAROS     2,694,412
MULTIPOSITION FLUID VALVE
Filed Sept. 21, 1950     2 Sheets-Sheet 1
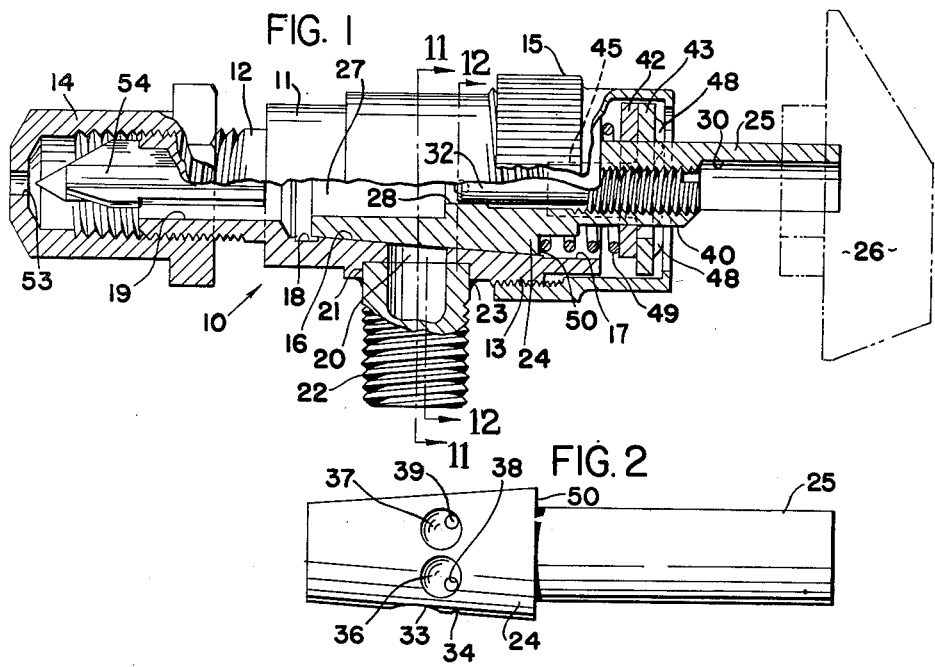
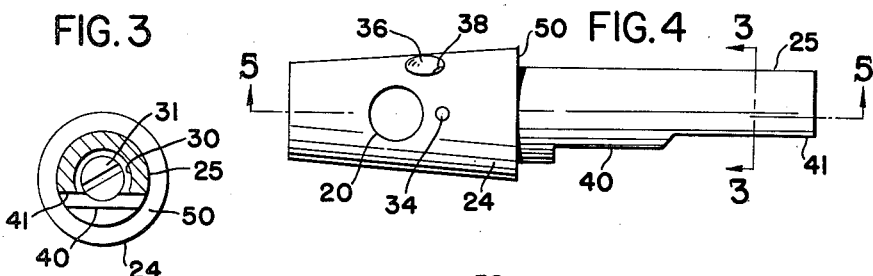
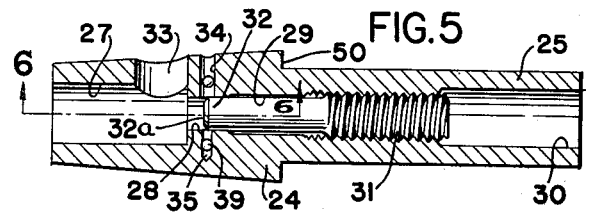
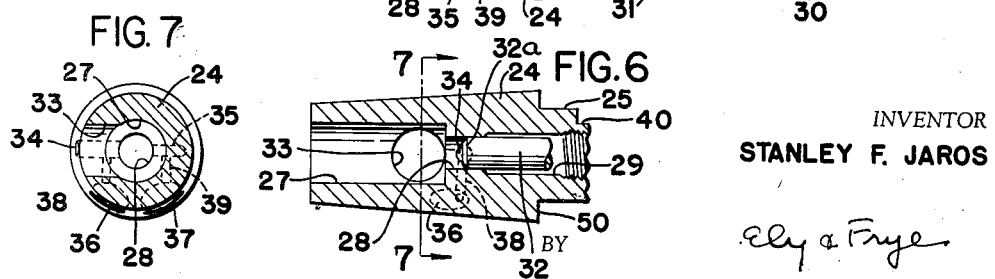
INVENTOR
STANLEY F. JAROS
*Ely & Frye*
ATTORNEYS Nov. 16, 1954  S. F. JAROS  2,694,412
MULTIPOSITION FLUID VALVE
Filed Sept. 21, 1950  2 Sheets-Sheet 2
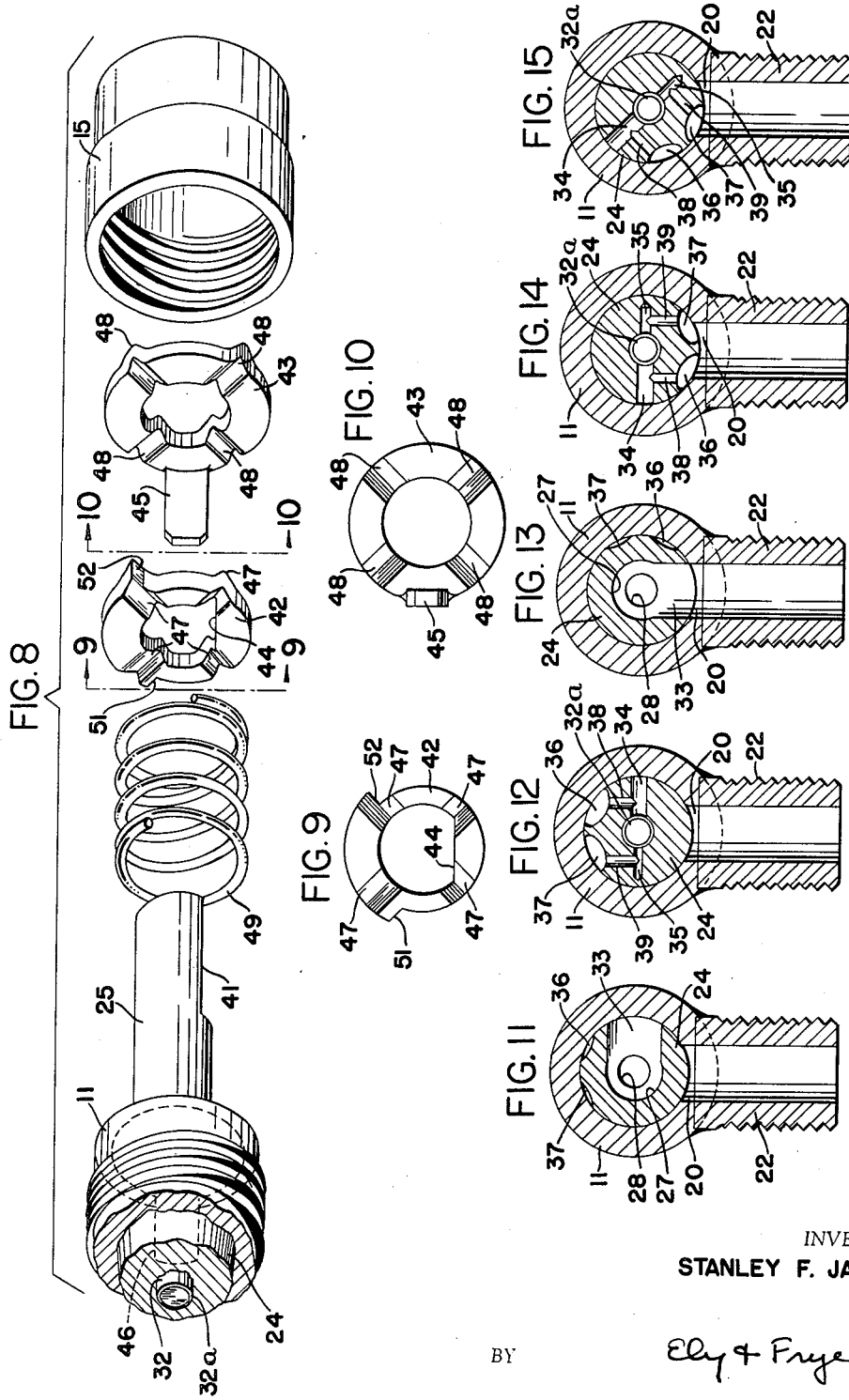
INVENTOR
STANLEY F. JAROS
BY Ely & Frye
ATTORNEYS 2,694,412

MULTIPOSITION FLUID VALVE

Stanley F. Jaros, Chagrin Falls, Ohio

Application September 21, 1950, Serial No. 186,074

1 Claim. (Cl. 137—599.2)

This invention relates to a multi-position fluid control valve for controlling the flow of a fluid in a supply line or conduit. The invention may be used to particular advantage in gas range installations to control the flow of gas in each of the several supply lines leading to individual burners.

A characteristic of gases, particularly gases of high B. t. u. ratings such as the bottled gases used in rural and suburban sections, is that extremely small orifices are required to meter the small amounts of gas required for a single burner; the fault of present valves when used for such high B. t. u. gases is that either a very slight angular adjustment of the valve handle opens the plug parts from "off" to "on" (making the burner difficult to adjust in intermediate positions) or very expensive metering passages must be lapped in the plug to permit wide angular movement of the plug stem in adjusting between the various positions. A further problem encountered in designing a metering type valve for gas ranges or other gas burning devices to be used in urban, suburban and rural localities is that the type of gas supplied may vary in different installations. Some units will have to use a low B. t. u. gas, such as carbureted water-gas, while others will use natural gas or fuels of still higher B. t. u., such as the bottled gases. It is desirable to provide a multiposition valve which, when the range is installed, can be given an initial setting dependent on the B. t. u. of the gas supplied so that, in each valve position, the desired intensity of flame is obtained. If there are, for example, three orifices in the valve for "high," "medium" and "simmer" positions, the relative cross sectional areas of the three orifices which would be suitable for a low B. t. u. gas must be scaled down approximately in proportion to provide suitable operation when a higher B. t. u. gas is used.

Heretofore, the efforts of the prior art to provide valves meeting the foregoing requirements depended upon the use of a multiplicity of small parts machined to extremely close tolerances and fittings precisely with each other. As a consequence, such prior art valves, while theoretically workable, were not adapted to inexpensive mass production. The best of such prior art valves required expensive metering gates at the separate points where the gas would be proportionately metered. One type of gate has taken the form of a slotted sleeve insert having an internal screw member which cuts off or opens the slots proportionately as it moves back and forth. An accurately located sloping drilled passage communicates with each slot to deliver fuel. The careful drilling in various directions and the provision of the accurately milled slotted sleeve installed with a reamed fit, make the manufacture of such a valve unduly costly.

It is, therefore, an object of this invention to provide an inexpensive multi-position metering control valve adapted to be initially or semi-permanently set to meter or control gases or other fluids of low, medium or high B. t. u. rating.

Another object of the invention is to provide a valve which can be given an initial setting according to the type of fuel used so as to give, in each valve position, the desired amount of flow for that position.

A further object of the invention is to provide a multiposition metering control valve which can be inexpensively produced in large part from bar stock by a series of simple operations.

It is a particular advantage of this invention that expensive metering parts have been eliminated while the valve has been so constructed that accurate metering is still attained. In mass production minimum skill and a minimum number of simple operations are required to produce this valve.

Still other and further objects and advantages will be apparent from the following specifications, claims and drawings of one embodiment of my invention.

In the drawings:

Figure 1 is a side elevation, partly in cross section, of the assembled valve.

Figure 2 is a top view of the valve stem.

Figure 3 is a section taken on line 3—3 of Figure 4.

Figure 4 is a side elevation of the valve stem.

Figure 5 is a section taken on line 5—5 of Figure 4.

Figure 6 is a section taken on line 6—6 of Figure 5.

Figure 7 is a section taken on line 7—7 of Figure 6.

Figure 8 is an exploded view showing details of the detent or click assembly.

Figure 9 is a view taken along line 9—9 of Figure 8.

Figure 10 is a view taken along line 10—10 of Figure 8.

Figure 11 is a section taken on line 11—11 of Figure 1 with the valve in the "off" position.

Figure 12 is a section taken on line 12—12 of Figure 1 with the valve in the "off" position.

Figure 13 is a section taken on line 11—11 of Figure 1 with the valve in the "full on" position.

Figure 14 is a section taken on line 12—12 of Figure 1 with the valve in the "medium" position.

Figure 15 is a section taken on line 12—12 of Figure 1 with the valve in the "simmer" position.

In the drawings, in which like reference numerals refer to like parts, 10 indicates generally the valve assembly. The valve housing 11 is provided with a threaded boss 12 on one end and threads 13 on the other end. The boss 12 is threadedly engaged with a hood 14 and threads 13 are engaged with a knurled cap nut 15. For about half its length and intermediate its ends the bore of housing 11 is frusto-conical in shape as at 16, while at both ends the bore is substantially cylindrical in shape with the cylinder radii varying at different axial locations along the bore as at 17, 18 and 19. Intersecting the frusto-conical portion 16 of the bore is a cylindrical radially extending inlet port 20. A shallow counterbore 21 receives a threaded inlet nipple 22 which is fixed to body 11 as by sweat soldering indicated at 23.

Seated on the frustro-conical section 16 of the bore of housing 11 is a rotatable plug 24. Integral with plug 24 is a valve stem 25 attached to which is an operating handle shown in phantom view at 26. The plug (Figures 2–7) has a bore running axially throughout its length. As viewed in Figure 5, the diameter of the bore is relatively large at the left end of the plug as at 27, then becomes relatively small as at 28, then becomes slightly larger as at 29, and finally at the right end 25 the diameter of bore portion 30 is about the same as the diameter of bore portion 27. The bore portion 29 is tapped to threadedly receive adjusting screw 31. The smooth left end 32 of screw 31 is chamfered at 32a and is slidingly received in bore portion 28.

Large radial passage 33 intersects bore portion 27 at its inner end. Parallel to passage 33 and axially inwardly along the plug therefrom radial passages 34, 35 intersect bore portion 28. It will be noted that the diameter of 35 is smaller than the diameter of 34. These passages 34, 35 can be made by the use of a step drill (the diameter of which is reduced or "stepped" near the tip) by drilling from the top, as viewed in Figure 5, until the drill has passed through bore portion 28 and has drilled through somewhat more than half the thickness of the bottom wall of plug 24.

Axially intermediate passages 33 and 34 and on opposite sides of a plane passing through the plug axis and normal to the axis of 33 and 34 are a pair of pockets 36, 37. The axial and circumferential location of all the various passages, ports and pockets is such that by turning plug 24 inlet port 20 can be caused to communicate directly with either passage 33 or with one or both of pockets 36, 37, but never directly with passage 34. Running from pocket 36 to passage 34 is a hole 38. Running from pocket 37 to passage 35 is another hole 39. As seen in Figure 7, the projections of these holes 38, 39 on a plane passing through the axis of passage 33 and plug 24 are preferably normal to the axis of passage 33. However, as seen in Figure 6, these holes may have a slight slant axially inwardly along plug 24 from pockets 36 and 37 to passages 34 and 35, respectively. As seen in Figure 2, holes 38 and 39 intersect pockets 36 and 37 at positions eccentric with respect to the center of the pockets. Each eccentric location is where a drill tends to center itself when drilling holes 38 or 39 as may be understood by an examination of Figure 7 wherein it is seen that the eccentric location is at the deepest point of the pocket in the direction of drilling. It should be noted that this drilling need not be particularly accurate as will be explained below. Also, since holes 38 and 39 are parallel, they can be drilled in a single operation by parallel drills.

As may be seen in Figures 3 and 4, stem 25 has chordal surfaces 40 and 41 cut away. Surface 40 forms a solid plane, but surface 41 intersects bore portion 30 of stem 25 (see Figure 1). Mounted around stem 25 are click washers 42 and 43. Washer 42 is keyed to move rotatively with stem 25 by flat 44 (see Figures 8 and 9) which locks with surface 40. Washer 43 is keyed to housing 11 by means of lug 45 which engages in slot 46 of the housing. Since the housing is fixed, washer 43 is fixed against rotation. Washers 42 and 43 have, respectively, cooperating teeth 47 and detent notches 48. Spring 49 mounted around the plug stem 25 rides against shoulder 50 and washer 42. Washer 42 is thereby urged against washer 43 which is retained by cap nut 15 and teeth 47 seat themselves in detent notches 48. Upon rotation of stem 25 teeth 47 are wedged out of notches 48 against the force of spring 49; a quarter turn later the teeth 47 again seat themselves in notches 48 and hold stem 25 in its new position until it is again turned. Stops 51 and 52 on washer 42 cooperate with lug 45 to limit rotative movement of stem 25 to somewhat under 270°.

As Figures 11 and 12 show, when the valve is in the "off" position neither pockets 36, 37 nor passage 33 are in communication with inlet port 20. Figure 13 illustrates the position of the parts when the valve has been turned one quarter turn counterclockwise (i. e. clockwise as viewed in Figures 11-15) from the "off" to the "full on" position. In this position gas flows freely through port 20, passage 33, plug bore portion 27, housing bores 18 and 19 and out to the burner line through orifice 53 in hood 14. By taking up or backing off on the hood, needle 54 can be urged into or away from orifice 53. The needle's position relative to the orifice determines the maximum amount of gas that can be delivered through the valve and hence determines the amount of gas that is delivered in "full on" position.

Figure 14 shows the position of the parts when the valve is turned an additional quarter turn clockwise (as viewed in this figure) to the "medium" position. Passage 33 (not shown in this view) has moved to the left out of juxtaposition with inlet port 20, but both pockets 36 and 37 communicate with this port. The gas flows through inlet port 20, pockets 36 and 37, holes 38 and 39, passages 34 and 35, plug bore portions 28 and 27, housing bores 18 and 19 and out through orifice 53. The total cross sectional area of passages 34 and 35 is less than that of orifice 53 and in the "medium position" the amount of flow is determined by the extent to which end 32 of screw 31 covers passages 34 and 35. Of course, this flow in "medium" position is reduced as end 32 is moved to the left (as viewed in Figure 5).

Figure 15 shows the position of the parts when the valve is finally turned in the clockwise direction (as viewed in this figure) as far as it will go which is approximately an additional 45°. Stop 52 engages lug 45 to determine this "simmer" position. Now pocket 37 alone is in direct communication with inlet port 20. The gas flows through inlet port 20, pocket 37, hole 39, passage 35, plug bore portions 28 and 27, housing bores 18 and 19, and out through orifice 53. In this position the amount of flow is determined by the extent to which end 32 covers passage 35.

It will be evident that as the valve is returned from "simmer" back through "medium" and "high" to "off" stop 51 engages lug 45 to prevent rotation past "off" position.

For purposes of clarity the difference between the diameters of passages 34 and 35 has been somewhat exaggerated in the drawings. These diameters can be the same, but it has been found in practice that a difference in diameter of one or several standard drill sizes within the range of drill size Numbers 48 to 56 renders the valve adaptable to very satisfactory metering of gas of various B. t. u. rating. The use of a step drill having standard drill size Numbers 51 and 53 has been found to give excellent results. It will be evident that to drill these two radial passages in a single drilling operation is a simple and relatively inexpensive operation, especially since the drill need merely be positioned in a direction exactly normal to that in which the plug is held during drilling.

Adjustment of the valve for a given supply of gas is an easy matter. Hood 14 is screwed in or out on boss 12 until the desired amount of flame in "high" position is obtained. Then a screwdriver is used to turn screw 31 until screw end 32 restricts flow from passages 34 and 35 to plug bore portion 28 to give the desired size flame in "medium" and "simmer" positions. The adjustments in "medium" and "simmer" positions are not independent of each other since each is a function of the setting of screw 31. Theoretically it might seem that the diameters of passages 34 and 35 should be the same to make these two functions proportional; however, as mentioned above, the slight difference in diameters between passages 34 and 35 proves itself to be the best practical arrangement.

In practice, the orifices defined between chamfer 32 and passages 34 and 35 are relatively small even for gases of low B. t. u. This means that the accuracy of interception of the various drilled passages (especially 39 with 35 and 38 with 34) is not critical but, on the contrary, as long as the passages communicate to some extent, the valve will perform satisfactorily.

From the foregoing, it is apparent that this invention is not limited to the particular illustrated application, but, in view of this disclosure, may be modified and varied by those skilled in the art from the preferred embodiment herein disclosed.

What is claimed is:

A valve structure comprising a hollow casing having a plug seat, an inlet passage in said casing opening on said seat, a plug having a bore throughout its length, a frustro-conical bearing surface on said plug having as its axis of generation the longitudinal axis of said plug, said plug being received in said seat with said bearing surface in sliding contact with said seat, a plurality of pockets in said surface angularly spaced about said longitudinal axis, first passages in said plug communicating with said pockets and forming intersections with the side wall of said bore, said first passages extending substantially at right angles to said bore in the vicinity of said intersections, a longitudinally adjustable member threadedly engaged in said bore, said member having a smooth cylindrical shank portion terminating at one end to form an annular metering shoulder which is in longitudinally adjustable direct juxtaposition with each of said intersections, the centers of said intersections lying in a common plane perpendicular to said longitudinal axis of said plug, said passages being circular in cross-section and of different diameters, a second passage in said plug communicating with the outside of said frustro-conical surface and with said bore, the effective cross-section of said second passage being greater than that of all of said first passages when said metering shoulder is in fully withdrawn position, said second passage being offset along the length of said plug from said pockets, both said second passage and said pockets being located in said plug to be successively brought into juxtaposition with said inlet passage as said plug is turned in said seat, said bore having an outlet end communicating with the interior of said hollow casing, and an outlet opening in said casing.

References Cited in the file of this patent

UNITED STATES PATENTS

| Number | Name | Date |
| --- | --- | --- |
| 1,921,779 | Roberts | Aug. 8, 1933 |
| 2,062,896 | Martocello | Dec. 1, 1936 |
| 2,138,767 | Mathews | Nov. 29, 1938 |
| 2,219,761 | Burdick | Oct. 20, 1940 |
| 2,224,566 | Jaros | Dec. 10, 1940 |
| 2,257,886 | Mueller | Oct. 7, 1941 |
| 2,335,519 | Lamar | Nov. 30, 1943 |
| 2,583,959 | Mueller | Jan. 29, 1952 |